(12) United States Patent
Kitayama

(10) Patent No.: US 6,467,029 B1
(45) Date of Patent: Oct. 15, 2002

(54) DATA MANAGEMENT APPARATUS AND A DATA MANAGEMENT METHOD

(75) Inventor: Yasuhide Kitayama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/288,168

(22) Filed: Apr. 8, 1999

(30) Foreign Application Priority Data

Oct. 29, 1998 (JP) .......................................... 10-308039

(51) Int. Cl.[7] .............................................. G06F 12/00
(52) U.S. Cl. ...................... 711/135; 711/145; 709/104; 709/211; 709/226
(58) Field of Search ........................ 711/118, 133–136, 711/145; 709/104, 211, 226

(56) References Cited

U.S. PATENT DOCUMENTS

| | | | | |
|---|---|---|---|---|
| 5,261,051 A | * | 11/1993 | Masden et al. | 711/152 |
| 5,729,712 A | * | 3/1998 | Whittaker | 711/122 |
| 5,809,242 A | * | 9/1998 | Shaw et al. | 709/217 |
| 5,809,250 A | * | 9/1998 | Kisor | 709/227 |
| 5,873,100 A | * | 2/1999 | Adams et al. | 707/204 |

* cited by examiner

Primary Examiner—Matthew Kim
Assistant Examiner—Matthew D. Anderson
(74) Attorney, Agent, or Firm—Leydig, Voit & Mayer, Ltd.

(57) ABSTRACT

This invention provides a data management apparatus and method for facilitating management of caching data stored by a data searching unit. When the data searching unit requests data a data-source server, a caching data managing unit controls the quantity caching data stored in the data searching unit. The caching data managing unit can delete the caching data, suppress storing particular caching data, and move particular caching data location without using the data searching unit.

8 Claims, 5 Drawing Sheets

Fig. 4

| index.htm | 2 | www.aaa.co.jp | browserA | TEXT |
| xxx.gif | 100 | www.bbb.co.jp | browserB | GIF |
| yyy.jpg | 200 | www.ccc.co.jp | browserA | JPG |
| ... | ... | ... | ... | ... |

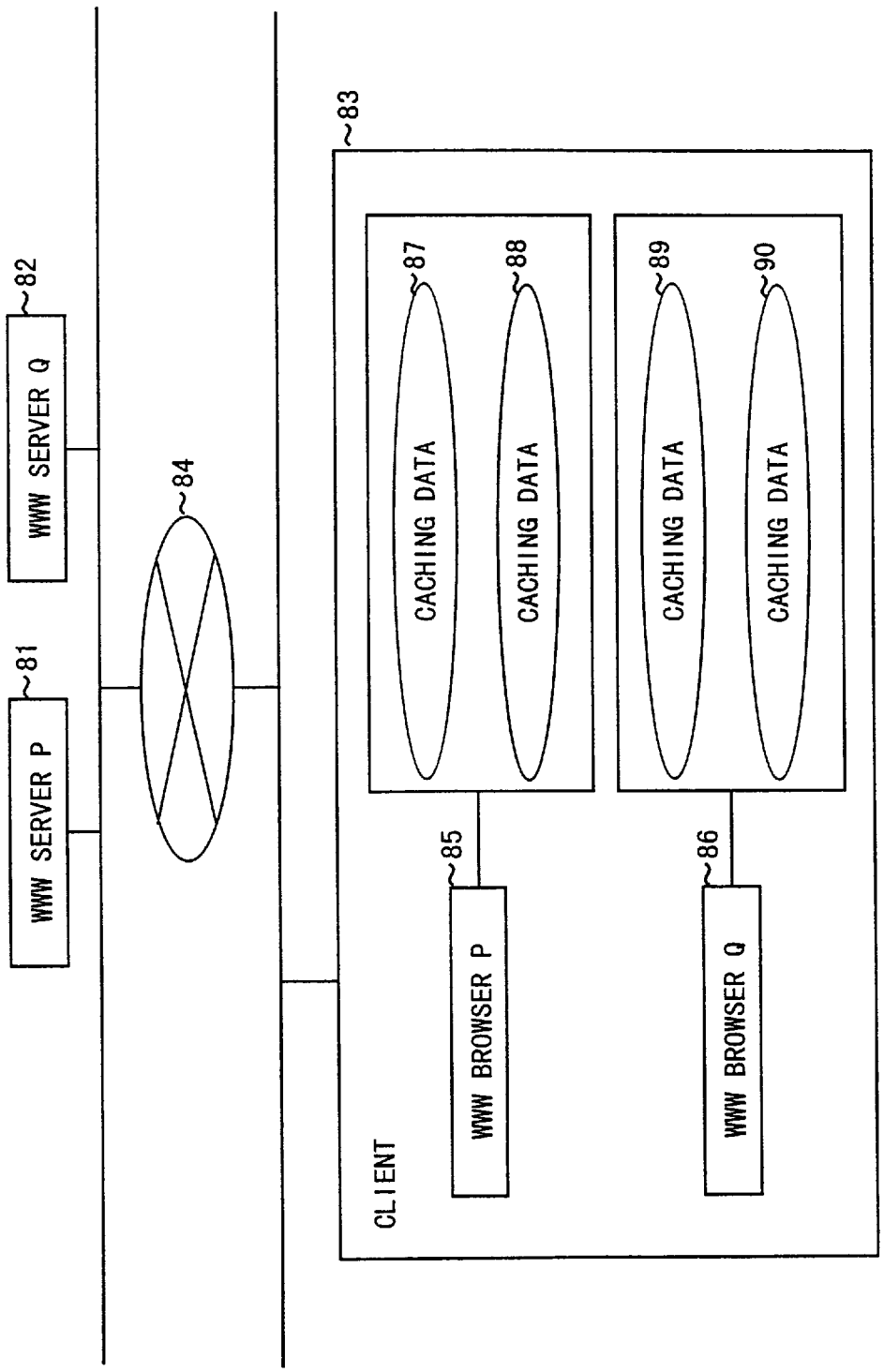

DATA MANAGEMENT APPARATUS AND A DATA MANAGEMENT METHOD

BACKGROUND OF THE INVENTION

1. Field of the Invention

This invention relates to management of caching data stored by a data searching unit of a client, when the client refers to data in a server by using the data searching unit.

Particularly, this invention relates to management of the caching data stored in the client by a WWW (World Wide Web) browser, when the client has accessed a WWW server.

2. Description of the Related Art

FIG. 5 illustrates management of caching data stored by a WWW browser according to the related art.

In FIG. 5, the caching data are data stored in the client temporarily, when the WWW browser has accessed a WWW server. A WWW server P 81 provides service of transmitting and sharing data, and a WWW server Q 82 provides service of transmitting and sharing data. A client 83 is a terminal or program for requesting the service of transmitting and sharing data. The WWW server P 81 and the WWW server Q 82 are connected to the client 83 through a network 84.

In FIG. 5, a WWW browser P 85 receives transmission data from the WWW server P 81 and WWW server Q 82 by requesting service. A WWW browser Q 86 receives transmission data from the WWW server P 81 and WWW server Q 82 by requesting service. When the WWW browser P 85 receives the transmission data from the WWW server P 81, the WWW browser P 85 stores caching data 87. When the WWW browser P 85 receives the transmission data from the WWW server Q 82, the WWW browser P 85 stores caching data 88. When the WWW browser Q 86 receives the transmission data from the WWW server P 81, the WWW browser Q 86 stores caching data 89. When the WWW browser Q 86 receives the transmission data from the WWW server Q 82, the WWW browser Q 82 stores caching data 90.

Operations are explained.

When the client 83 requests service to the WWW server P 81 by using the WWW browser P 85, the WWW browser P 85 receives transmitted data from the WWW server P 81, and stores the caching data 87.

When the client 83 requests service to the WWW server Q 82 by using the WWW browser P 85, the WWW browser P 85 receives transmitted data from the WWW server Q 82, and stores the caching data 88.

Similarly, when the client 83 requests service to the WWW server P 81 by using the WWW browser Q 86, the WWW browser Q 86 receives transmitted data from the WWW server P 81, and stores the caching data 89.

When the client 83 requests service to the WWW server Q 82 by using the WWW browser Q 86, the WWW browser Q 86 receives transmitted data from the WWW server Q 82, and stores the caching data 90.

In this way, the caching data are stored in the client 83.

When the client 83 wants to delete the stored caching data 87 and 88, the client 83 must delete the data by the WWW browser 85. Therefore, the client must raise the WWW browser P 85 and use a delete function of the browser.

Similarly, when the client 83 wants to delete the caching data 89 and 90, the client 83 must raise the WWW browser Q 86 and use a delete function of the browser.

When the client wants to delete only the caching data 87, the client cannot use the delete function of the WWW browser P 85. Therefore, the client must follow a directory of the caching data stored by the WWW browser P 85 and select files, which are assumed to be stored at the time of receipt of the transmitted data from the WWW server P 81. Then, the client specifies the files explicitly and deletes the caching data 87 manually without using the delete function of the browser.

Similarly, when the client wants to delete only the caching data 88, the client specifies files explicitly and deletes the caching data 88 manually.

When the client wants to delete only the caching data 89, the client cannot use the function of the WWW browser Q 86. Therefore, the client must follow a directory of the caching data stored by the WWW browser Q 86 and select files, which are assumed to be stored at the time of receipt of the transmitted data from the WWW server P 81. Then, the client specifies the files explicitly and deletes the caching data 89 manually without using the delete function of the browser.

Similarly, when the client wants to delete only the caching data 90, the client specifies files explicitly and deletes the caching data 90 manually.

As stated, according to the related art, the caching data stored by the WWW browser P85 or Q 86 had to be managed by the WWW browser P 85 or Q 86.

Therefore, the WWW browser P 85 had to be raised to delete the caching data 87 and 88, and the WWW browser Q 86 had to be raised to delete the caching data 89 and 90. That was time-consuming.

Besides, when all the caching data 87, 88, 89 and 90 stored by the WWW browsers P 85 and Q 86 became useless, it was impossible to delete all of them in a batch process.

Further, some WWW browsers do not have a function to suppress storing the caching data. When such a browser was used, the caching data were stored by the WWW browser, even if it was not necessary to store the caching data, and the client of the WWW browser had to delete the stored caching data manually.

Further, when the client used a plurality of WWW servers, the WWW browser didn't manage when the caching data were stored, i.e., from which WWW server the transmitted data were received and the caching data were stored. Therefore, when the client wanted to delete the caching data from a particular WWW server, a delete operation was complicated and time-consuming. Besides, the delete operation could be only performed after accessing the WWW server.

Further, it was impossible to manage storing periods of the caching data in the WWW browsers by the WWW browsers.

Further, it was impossible to set the WWW browser to store only the caching data from a particular WWW server, e.g., to store the caching data from the WWW server P 81 and not to store the caching data from the WWW server Q 82.

Further, the WWW browser could not manage suppression of storing the caching data with a particular data type.

Further, the WWW browser could not manage to suppression of storing the caching data exceeding a particular data size.

Furthermore, the WWW browser could not manage to move the caching data with a particular data type to another designated location and store them at the location.

SUMMARY OF THE INVENTION

This invention intends to solve the above-stated problems. This invention aims at providing a data processing apparatus for managing caching data by using a caching data managing unit between a data searching unit and a server in which data are searched, i.e., a data-source server. Particularly, this invention aims at managing the caching data by providing the caching data managing unit between a WWW server and a WWW browser in a proxy setting.

This invention also aims at enabling the data searching unit to perform a batch processing, deleting the stored caching data.

This invention also aims at always deleting the caching data automatically when a data searching unit cannot suppress storing the caching data.

This invention also aims at identifying the data-source server, from which the caching data are received, and storing the identification data.

This invention also aims at providing the storing period of the caching data in the data searching unit and deleting the caching data after the provided storing period.

This invention also aims at managing storage the caching data 87 stored by a particular data searching unit and not storing the caching data stored by other data searching units.

This invention also aims at managing the data searching unit to suppress storing only the caching data with a data type predetermined by the client.

This invention also aims at managing the data searching unit to suppress storing of the caching data exceeding a data size predetermined by the client.

This invention also aims at enabling the data searching unit to manage moving of the caching data with a data type predetermined by the client to another designated location and store the caching data.

According to one aspect of this invention, a data management apparatus includes a searched data memory for storing searched data, a data searching unit for searching data and storing the searched data as caching data in the searched data memory, and a caching data managing unit for controlling a storing amount of the caching data in the searched data memory.

According to another aspect of this invention, the caching data managing unit in the data management apparatus includes a caching data deleting unit for deleting the caching data stored in the searched data memory.

According to another aspect of this invention, the caching data managing unit in the data management apparatus includes a caching data suppress-storing unit for suppressing storing particular caching data.

According to another aspect of this invention, the caching data managing unit in the data management apparatus includes a caching data moving unit for moving predetermined caching data to a predetermined location.

According to another aspect of this invention, a data management method includes a searched data memory for storing searched data, and includes the steps of searching data and storing the searched data as caching data in the searched data memory, and controlling a storing amount of the caching data stored in the searched data memory.

Further features and applications of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Other objects features, and advantages of the invention will be apparent from the following description when taken in conjunction with the accompany drawings.

BRIEF DESCRIPTION OF THE DRAWINGS

FIG. 4 shows an example of a caching data identification data list according to this invention; and FIG. 5 shows a configuration chart in a management method of caching data created by a WWW browser according to the related art.

DETAILED DESCRIPTION OF THE PREFERRED EMBODIMENTS

Embodiment 1

Figure 1:
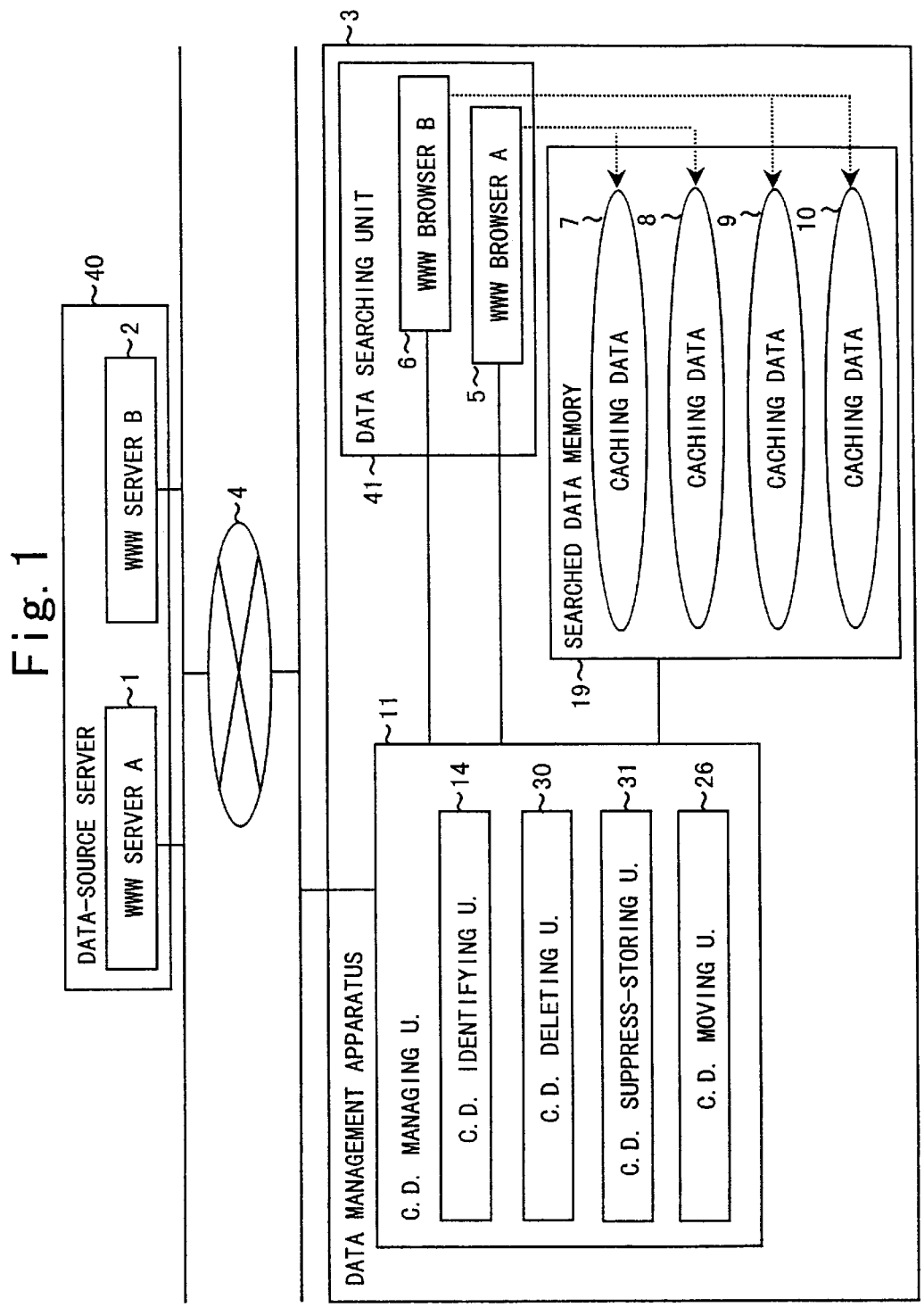
FIG. 1 illustrates a data management apparatus and its peripheral apparatuses according to an embodiment of this invention.

FIG. 1 illustrates a data management apparatus and its peripheral apparatuses according to an embodiment of this invention.

A data management method can be also realized by using the data management apparatus according to this invention.

In FIG. 1, a data-source server 40, network 4, and data management apparatus 3 are illustrated. The data-source server 40 provides data transmitting and sharing service.

In FIG. 1, a WWW server A 1 is an example of the data-source server for providing the data transmitting and sharing service, and a WWW server B 2 is another example of the data-source server for providing the data transmitting and sharing service.

The network 4 connects the data-source server and the data management apparatus 3. The data management apparatus 3 receives data providing service from the data-source server 40. For example, the data management apparatus 3 searches data, stores the searched data as caching data, and controls a storing amount of the stored caching data.

In embodiments of this invention, the caching data are data which are obtained from the data-source server by the data management apparatus and temporarily stored in the data management apparatus 3 with or without modification.

The data management apparatus 3 includes a data searching unit 41, searched data memory 19, and caching data managing unit 11.

The data searching unit 41 requests the data-source server 40 to provide data, and receives corresponding transmitted data from the data-source server 40. A WWW browser A 5 is an example of the data searching unit 41, which receives the transmitted data from the data-source server 40, and a WWW browser B 6 is another example of the data searching unit 41, which receives the transmitted data from the data-source server 40.

The searched data memory 19 temporarily stores the data, which are obtained from the data-source server by the data management apparatus, in the data management apparatus 3, with or without modification.

Caching data 7, 8, 9, and 10 are examples of caching data stored in the searched data memory. When the WWW browser A 5 receives the transmitted data from the WWW server A 1, the WWW browser A 5 stores the caching data 7. When the WWW browser A 5 receives the transmitted data from the WWW server B 2, the WWW browser A 5 stores the caching data 8. When the WWW browser B 6 receives the transmitted data from the WWW server A 1, the WWW browser B 6 stores the caching data 9. When the WWW browser B 6 receives the transmitted data from the WWW server B 2, the WWW browser B 6 stores the caching data 10.

The caching data managing unit 11 controls a storing amount, i.e.:, the quantity of the caching data stored in the searched data memory 19. The caching data managing unit 11 is a characteristic element of this invention. The caching data managing unit 11 operates between the data-source server 40 and the data searching unit 41 as a proxy. Further, the caching data managing unit 11 includes a caching data identifying unit 14, caching data deleting unit 30, caching data suppress-storing unit 31, and caching data moving unit 26.

Figure 2:
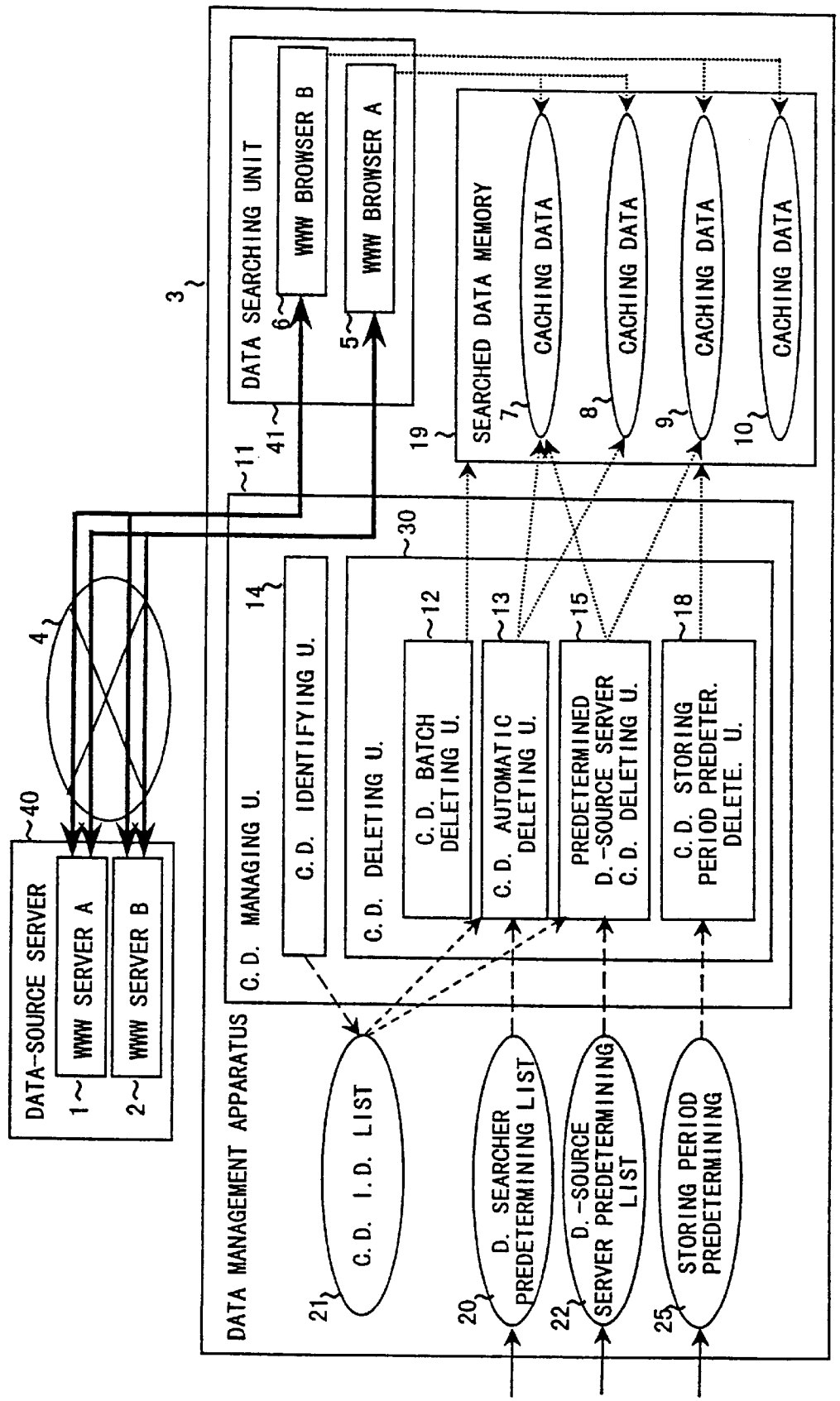
FIG. 2 illustrates the data management apparatus with details of a caching data deleting unit and a data flow as an embodiment of this invention.
Figure 3:
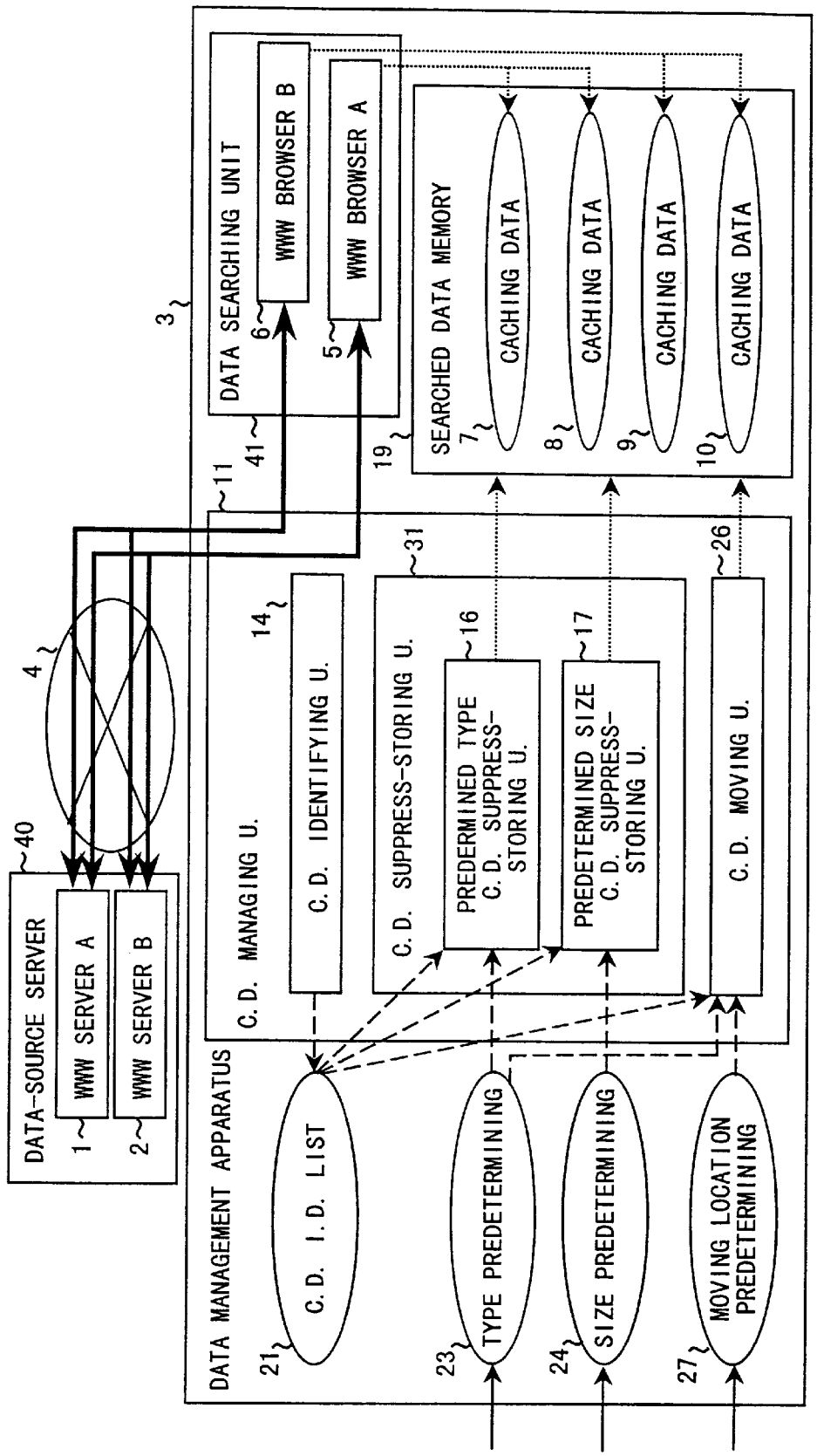
FIG. 3 illustrates the data management apparatus with details of a caching data suppress-storing unit and caching data moving unit as an embodiment of this invention.

The caching data identifying unit 14 checks data for identifying the caching data stored in the searched data memory 19, and creates a caching data identification data list 21. The caching data identification data list 21 is a memory for storing the caching data identification data checked by the caching data identifying unit 14. The caching data identification data list 21 is illustrated in FIGS. 2 and 3, but not in FIG. 1.

For example, the caching data identifying unit 14 creates the caching data identification data list 21 as illustrated in FIG. 4. In FIG. 4, the caching data identification data list 21 includes a file name, file size, name of the data-source server, name of the data searching unit and file type of the caching data to be stored in the searched data memory 19. As the name of the data searching unit, either a name of a software for providing the browser or a symbolized name can be used as long as it does not conflict with the name used in the caching data identifying unit 14, later-explained data searcher predetermining list 20, etc. Further, the caching data identification data list 21 may store other data besides the above-stated data or a part of the above-stated data.

The caching data deleting unit 30 deletes the caching data stored in the searched data memory 19, and the caching data suppress-storing unit 31 suppresses storing particular data. The caching data moving unit 26 moves predetermined caching data to a predetermined location.

Operations are explained. In embodiment 1, operations of a whole system and the caching data managing unit 11 illustrated in FIG. 1 are outlined. Processing operations of the caching data deleting unit 30, caching data suppress-storing unit 31, and caching data moving unit 26 are explained in detail in embodiment 2 and later embodiments.

In the data management apparatus 3, the data searching unit 41 requests the data-source server 40, through the caching data managing unit 11, to provide data. Then, the data-source server 40 transmits searched data to the data searching unit 41. When the data searching unit 41 receives the data from the data-source server 40, the data searching unit 41 receives the data from the data-source server 40 via the caching data managing unit 11 in the proxy setting. As stated, the data searching unit 41 always accesses the data-source server 40 via the caching data managing unit 11.

The caching data identifying unit 14 in the caching data managing unit 11 checks identification data of the received data, and stores the identification data in the caching data identification data list 21 before transmitting the received data to the data searching unit 41. When the caching data deleting unit 30, caching data suppress-storing unit 31, and caching data moving unit 26, which are explained later, deletes the data, suppresses storing the data, and moves the data from the searched data memory 19, corresponding identification data in the caching data identification data list 21 are also deleted.

The data searching unit 41 includes a plurality of searchers. With reference to FIG. 1, explanations are made on operations in case that the WWW browser A5 and WWW browser A6 are the searchers in the data searching unit 41.

For example, when the WWW browser A 5 requests the WWW server A 1 to provide data, the WWW browser A 5 receives transmitted data from the WWW server A 1, and stores the caching data 7.

When the WWW browser A 5 requests the WWW server B 2 to provide data, the WWW browser A 5 receives transmitted data from the WWW server B 2, and stores the caching data 8.

When the WWW browser B 6 requests the WWW server A 1 to provide data, the WWW browser B 6 receives transmitted data from the WWW server A 1, and stores the caching data 9.

When the WWW browser B 6 requests the WWW server B 2 to provide data, the WWW browser B 6 receives transmitted data from the WWW server B 2, and stores the caching data 10.

If necessary, the caching data identifying unit 14 in the caching data managing unit 11 checks the received data from the data-source server before transferring to the data searching unit 41. Then, the data are transferred to the data searching unit 41.

Embodiment 2

In embodiment 1, the operations of the caching data managing unit 11 were outlined. In embodiment 2, batch processing of deletion of the caching data by the caching data deleting unit 30 in the caching data managing unit 11 is explained.

FIG. 2 illustrates the data management apparatus 3 with a detail of the caching data deleting unit 30 as an embodiment of this invention. FIG. 2 also shows a data flow. In FIG. 2, the caching data suppress-storing unit 31 and caching data moving unit 26 illustrated in FIG. 1 are omitted.

In embodiment 2, the caching data deleting unit 30 in the caching data managing unit 11 includes at least a caching data batch deleting unit 12. The caching data batch deleting unit 12 deletes the caching data stored in the searched data memory 19 in a batch process.

Operations of the caching data batch deleting unit 12 are explained.

In embodiment 2, the data searching unit 41 requests the data from the datasource server 40, and receives the searched data as in embodiment 1. This operation is also same in other embodiments.

The caching data batch deleting unit 12 deletes the caching data in the searched data memory 19 in a batch process upon request of a user of the data management apparatus 3.

It is also possible to delete the caching data in the searched data memory 19 regularly by providing a scheduler, etc. for the caching data batch deleting unit 12.

Embodiment 3

In embodiment 3, caching data stored by a particular data searcher among a plurality of data searchers are deleted automatically.

In embodiment 3, the data management apparatus 3 includes the caching data identification data list 21 created by the caching data identifying unit 14 and the data searcher predetermining list 20. The caching data deleting unit 30 in the caching data managing unit 11 includes at least a caching data automatically deleting unit 13. The caching data identification data list 21 is created as explained in embodiment 1.

The caching data automatically deleting unit 13 automatically deletes the caching data stored by the data searcher identified, i.e., predetermined by the user from among the plurality of data searchers.

The data searcher predetermining list 20 is stored in a memory for storing data for the predetermining data searcher, which stores caching data to be deleted automatically by the caching data automatically deleting unit 13. The list must be inputted by the user of the data management apparatus.

Operations are explained.

At first, the data searcher predetermining list 20 must be created. The user of the data management apparatus inputs the data searcher from which caching data are deleted. The inputted data searcher is written in the data searcher predetermining list 20.

Then, the caching data automatic deleting unit 13 selects the caching data stored in the searched data memory 19 based on the data searcher predetermining list 20 and caching data identification data list 21, and deletes the selected caching data.

The caching data automatic deleting unit 13 searches for the data searcher in the data searching unit 41, which has stored the caching data in the searched data memory 19, based on the caching data identification data list 21. Then, the caching data automatic deleting unit 13 checks if the data searcher searched by the caching data automatic deleting unit 13 is the searcher predetermined in the data searcher predetermining list 20. When the data searcher is in the data searcher predetermining list 20, the caching data from the searched data searcher are deleted.

Explanations are made for the case in which the WWW browser A is predetermined in the data searcher predetermining list 20.

For example, the WWW browser A is predetermined in the data searcher predetermining list 20 in FIG. 2. The name of the WWW browser A is stored in the data searcher predetermining list 20. The caching data automatic deleting unit 13 deletes the caching data 7 and 8 as illustrated in FIG. 2.

Embodiment 4

In embodiment 4, caching data stored when data are searched in a predetermined data-source server among a plurality of data-source servers are deleted.

In embodiment 3, the data management apparatus 3 includes the caching data identification data list 21 and a data-source server predetermining list 22. The caching data deleting unit 30 in the caching data managing unit 11 includes at least a predetermined data-source server caching data deleting unit 15.

The predetermined data-source server caching data deleting unit 15 deletes the caching data, which are stored from the predetermined data-source server among the plurality of data-source servers.

The data-source server predetermining list 22 includes a predetermined data-source server from which caching data to be deleted by the predetermined data-source server caching data deleting unit 15 are stored. The list must be inputted by the user of the data management apparatus.

Operations are explained.

At first, the data-source server predetermining list 22 must be created. The user of the data management apparatus inputs the data-source server of the caching data to be deleted. The inputted data-source server is written in the data-source server predetermining list 22.

Then, the predetermined data-source server caching data deleting unit 15 selects the caching data stored in the searched data memory 19 based on the caching data identification data list 21 and data-source server predetermining list 22, and deletes the selected caching data.

The predetermined data-source server caching data deleting unit 15 searches for the server in the data-source server 40, from which the caching data are stored in the searched data memory 19, based on the caching data identification data list 21. Then, the predetermined data-source server caching data deleting unit 15 checks if the searched server is the data-source server predetermined in the data-source server predetermining list 22. When the server is in the data-source server predetermining list 22, the caching data from the searched server are deleted.

For example, the WWW server A is predetermined in the data-source server predetermining list 22 in FIG. 2. The predetermined data-source server caching data deleting unit 15 deletes the caching data 7 and 9.

Embodiment 5

In embodiment 5, the caching data are deleted after a predetermined storing period.

In embodiment 5, the data management apparatus 3 includes caching data deleting unit 30 including at least a caching data storing period predetermining deleting unit 18 in the caching data managing unit 11 and a storing period predetermining 25 as illustrated in FIG. 2.

The caching data storing period predetermining deleting unit 18 deletes the caching data after the predetermined storing period.

The storing period predetermining 25 is a memory for storing the predetermined storing period of the caching data to be deleted by the caching data storing period predetermining deleting unit 18. The storing period must be inputted by the user of the data management apparatus. If the storing period is not inputted, the caching data storing period predetermining deleting unit 18 uses a storing period provided as an initial value, and deletes the caching data.

Operations are explained.

At first, the storing period predetermining 25 is provided. The user of the data management apparatus inputs the storing period of the caching data, and the storing period is stored in the storing period predetermining 25.

Then, the caching data storing period predetermining deleting unit 18 checks stored periods of the caching data in the searched data memory 19 to select the caching data exceeding the storing period based on the storing period predetermining 25 or the storing period provided as the initial value, and deletes such caching data.

Embodiment 6

In embodiment 6, storing of the caching data with a predetermined data type is suppressed.

FIG. 3 illustrates the data management apparatus 3 with a detail of the caching data suppress-storing unit 31 and caching data moving unit 26 as an embodiment of this invention. FIG. 3 also shows a data flow. In FIG. 3, the caching data deleting unit 30 illustrated in FIG. 1 is omitted.

In embodiment 6, the data management apparatus 3 includes the caching data identification data list 21 created by the caching data identifying unit 14, the caching data suppress-storing unit 31 including at least a predetermined type caching data suppress-storing unit 16, and a type predetermining 23. The caching data identification data list 21 is created as explained in embodiment 1.

The predetermined type caching data suppress-storing unit 16 suppresses storing the caching data with a predetermined data type.

The type predetermining 23 is a memory for storing the predetermined data type of the caching data to be suppressed storing by the predetermined type caching data suppress-storing unit 16. The data type must be inputted by the user of the data management apparatus. If the data type is not inputted, the predetermined type caching data suppress-storing unit 16 uses a data type provided as an initial value, and suppresses storing the caching data.

Operations are explained.

At first, the type predetermining 23 is provided. The user of the data management apparatus inputs the data type of the caching data, and the data type is stored in the type predetermining 23.

Then, the predetermined type caching data suppress-storing unit 16 judges if the data received from the data-source server 40 are with the data type in the type predetermining 23 or the data type provided as the initial value based on the caching data identification data list 21. If the received data are with such data type, the data searching unit 41 deletes the caching data stored in the searched data memory 19 immediately.

As stated, the data type of the caching data to be deleted is predetermined in the type predetermining 23, and storing of the caching data with a particular data type, e.g., image data, is suppressed.

Embodiment 7

In embodiment 7, storing of the caching data with a predetermined data size is suppressed.

In embodiment 7, the data management apparatus 3 includes the caching data identification data list 21 created by the caching data identifying unit 14, the caching data suppress-storing unit 31 including at least a predetermined size caching data suppress-storing unit 17 in the caching data managing unit 11, and a size predetermining 24. The caching data identification data list 21 is created as explained in embodiment 1.

The predetermined size caching data suppress-storing unit 17 suppresses storing the caching data in or exceeding a predetermined data size.

The size predetermining 24 is a memory for storing the predetermined data size of the caching data to be suppressed storing by the predetermined size caching data suppress-storing unit 17. The data size must be inputted by the user of the data management apparatus. If the data size is not inputted, the predetermined size caching data suppress-storing unit 17 uses a data size provided as an initial value, and suppresses storing the caching data.

Operations are explained.

At first, the size predetermining 24 is provided. The user of the data management apparatus inputs the data size of the caching data, and the data size is stored in the size predetermining 24.

Then, the predetermined size caching data suppress-storing unit 17 judges if the data received from the data-source server 40 are in or exceeding the data size in the size predetermining 24 or the data size provided as the initial value based on the caching data identification data list 21. If the received data are in such data size, the data searching unit 41 deletes the caching data stored in the searched data memory 19 immediately.

As stated, the data size of the caching data to be deleted is predetermined in the size predetermining 24, and storing of the caching data in or exceeding a particular data size is suppressed.

Embodiment 8

In embodiment 8, predetermined caching data are moved to a predetermined location.

FIG. 3 illustrates the data management apparatus 3 with a detail of the caching data suppress-storing unit 31 and caching data moving unit 26 as an embodiment of this invention. FIG. 3 also shows a data flow.

In embodiment 6, the data management apparatus 3 includes the caching data moving unit 26, a moving location predetermining 27, the caching data identification data list 21, and the type predetermining 23 in FIG. 3. The caching data identification data list 21 is created by the caching data identifying unit 14 as explained in embodiment 1.

The caching data moving unit 26 moves the predetermined caching data to the predetermined location.

The moving location predetermining 27 is a memory for storing the predetermined location to which the caching data are moved by the caching data moving unit 26. The moving location must be inputted by the user of the data management apparatus. If the location is not inputted, the caching data moving unit 26 uses a moving location provided as an initial value, and moves the caching data.

Operations are explained.

At first, the moving location predetermining 27 must be provided. The user of the data management apparatus inputs the location to which the caching data are moved, and the location is stored in the moving location predetermining 27.

Then, the caching data moving unit 26 searches the caching data with the data type predetermined in the type predetermining 23 explained in embodiment 6 based on the caching data identification data list 21, and moves the searched caching data to the location predetermined in the moving location predetermining 27.

The processing by the caching data moving unit 26 can be made manually by the user of the data management apparatus 3.

It is also possible that the caching data moving unit 26 is started regularly by a scheduler to perform processing.

As stated, the caching data with the particular data type, e.g., image data, etc., are stored in one location by the type predetermining 23 and moving location predetermining 27.

In embodiment 8, data to be moved are selected based on the type predetermining 23. However, it is also possible to select the data based on the size predetermining 24. Other conditions may be provided to select the data.

It is also possible to realize embodiment 8 without using the caching data identification data list 21.

Embodiment 9

In embodiments 1–8, all the elements in FIGS. 1–3 are not necessary as far as the processing in each embodiment can be performed.

In embodiments 1–8, the caching data identification data list 21 created by the caching data identifying unit 14 is used to process efficiently. However, it is also possible to obtain necessary data in each processing step without using the caching data identification data list 21.

For example, the data management apparatus in FIG. 1 may include only the caching data deleting unit 30. Further, it is also possible to combine some processing steps depending on content of the processing.

Embodiment 10

In embodiments 1–9, the data-source server 40 and the data management apparatus 3 are connected through the network 4. However, it is not necessary that they are connected through the network. The data management apparatus according to this invention can be applied to a system including the data-source server 40 and data searching unit 41.

In embodiments 1–9, explanations are made on a system configuration with the WWW server and WWW browser. However, this invention can be applied to other kinds of database management system.

Further, the data management apparatus and method according to this invention can be also applied to a terminal as far as the data-source server 40 and data searching unit 41 exist.

Concerning on processing of the caching data, a processing operation, which can not be performed by the data searching unit, can be performed according to this invention.

According to this invention, when the caching data are to be deleted in a batch processing, it is not necessary to start each data searching unit to perform a delete processing. This can save time.

According to this invention, confidential data received from a particular data-source server do not remain as caching data in a mobile terminal unintentionally.

According to this invention, it is possible to control the caching data from a particular data-source server not to remain in the data management apparatus constantly.

According to this invention, it is not necessary to explicitly delete useless caching data after a certain period. Old useless caching data are deleted automatically after a certain storing period.

According to this invention, storing of image data which pressure a capacity of a disk is suppressed in the data management apparatus.

According to this invention, storing of the caching data in an unexpectedly large size is suppressed.

According to this invention, useful data, e.g., image data, can be moved to another location at the time of accessing a WWW server.

According to this invention, the caching data from a predetermined data-source server can be identified. Therefore, management of the caching data can be performed with reference to the data-source servers.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A data management unit for accessing target files via a network protocol utilizing the target files with a plurality of browser applications, comprising:

a server interface communicating search data to a network server and, in response, receiving at least one target file corresponding to the search data;

a memory manager storing indicia of the at least one target file received by the server interface in a memory, the indicia stored including identification indicia provided by the memory manager for subsequently accessing the indicia stored via one of the browser applications, the stored indicia being cached data, the memory manager comprising a data type cache data suppress-storing unit for suppressing storage of cache data of a predetermined data type;

a browser interface relaying the at least one target file to one of the browser applications; and a cache data deleting unit automatically deleting the cached data stored by one of the plurality of browser applications, and deleting stored cached data from a specific network server.

2. The data management unit of claim 1, wherein the cache data deleting unit further comprises a cache data batch deleting unit for deleting the cache data stored in the memory in a batch process.

3. The data management unit of claim 1, wherein the cache data deleting unit further comprises a cache data storing period deleting unit for deleting cached data after a storing period.

4. The data management unit of claim 1, wherein the cache data suppress-storing unit further comprises a size cache data suppress-storing unit for suppressing storage of cache data exceeding a data size.

5. The data management unit of claim 1, wherein the memory manager further comprises a cache data moving unit for moving cache data of the memory to a predetermined location.

6. The data management unit of claim 1, wherein one of the browser applications is a World Wide Web (WWW) browser.

7. A method of accessing target files via a network protocol and storing cache data of an accessed target file, the method comprising:

communicating search data from a server interface of a data managing unit to a network server;

receiving at least one target file at the server interface corresponding to the search data;

storing indicia of the at least one target file in a memory, the indicia stored including identification indicia for subsequently accessing the indicia stored from a browser application, the indicia stored being cached data;

suppressing storage of cache data if the cache data is of a predetermined data type by immediately deleting the cache data from the memory; and relaying the at least one target file via a browser interface to the browser application.

8. A data management unit for accessing target files via a network protocol utilizing the target files with a plurality of browser applications, comprising:

a server interface communicating search data to a network server and, in response, receiving at least one target file corresponding to the search data;

a memory manager storing in a memory indicia of the at least one target file received by the server interface, the indicia stored including identification indicia provided by the memory manager for subsequently accessing the indicia stored via one of the browser applications, the stored indicia being cached data;

a browser interface relaying the at least one target file to one of the browser applications;

a cache data deleting unit for deleting the cached data stored in the memory, wherein the cache data deleting unit automatically deletes cached data stored by one of the plurality of browser applications; and a plurality of network servers, wherein the cache data deleting unit comprises a network server cache data deleting unit for deleting cached data that is received from one of the plurality of network servers and stored in the memory.

* * * * *